United States Patent [19]

Courty

[11] Patent Number: 4,780,984

[45] Date of Patent: Nov. 1, 1988

[54] ANIMAL TRAP

[76] Inventor: Paul Courty, 79 Blanchard Street, Causapscal, Province of Quebec, Canada, G0J 1J0

[21] Appl. No.: 820

[22] Filed: Jan. 6, 1987

[51] Int. Cl.⁴ .......................................... A01M 23/26
[52] U.S. Cl. ........................................ 43/89; 43/82; 43/93
[58] Field of Search ................. 43/89, 88, , 90, 93, 43/58, 82, 75, 77, 81

[56] References Cited

U.S. PATENT DOCUMENTS

| | | | |
|---|---|---|---|
| 293,683 | 2/1884 | Symonds | 43/81 |
| 883,772 | 4/1908 | Armstrong | 43/93 |
| 968,990 | 8/1910 | Schuyler | 43/81 |
| 1,310,266 | 7/1919 | Walker | 43/88 |
| 1,331,324 | 2/1920 | Dickson | 43/89 |
| 1,359,820 | 11/1920 | Meredith | 43/93 |
| 1,527,034 | 2/1925 | Durrin | 43/88 |
| 1,753,814 | 4/1930 | Weller | 43/81 |
| 1,802,272 | 4/1931 | Rice | 43/81 |
| 2,087,440 | 7/1937 | Merz | 43/82 |
| 2,408,593 | 10/1946 | Barber | 43/89 |
| 3,950,884 | 4/1976 | Desrosiers | 43/81 |
| 4,235,038 | 11/1980 | Sauvageau | 43/82 |

Primary Examiner—Gene P. Crosby

[57] ABSTRACT

An animal trap adapted for outdoor use to catch relatively small game animals and particularly adapted to be attached to a tree, post, or the like upstanding support and to be used independently of the height of snow and of other unfavorable ground conditions. This animal trap has a fixed jaw and a movable jaw. A bracket with arms projects away from the plane of the fixed jaw. The movable jaw is pivoted to an operative position angularly upwardly relative to the fixed jaw. A detent lever is pivoted between the arms of the bracket with an outer end forming a catch portion intercepting the movable jaw and holding it in operative position. A pair of spring wires operatively bias the movable jaw and cooperate with a chain to attach the trap to a tree, post, or the like, and the bait is attached to the detent lever to pivot the latter and release the movable jaw that then closes against the fixed jaw under the action of the spring wires.

4 Claims, 3 Drawing Sheets

ANIMAL TRAP

This invention relates to an animal trap.

The animal trap of the present invention is particularly adapted for outdoor use to catch relatively small game animals.

It is another object of the present invention to provide an animal trap that can be attached to a tree, a post, or the like upstanding support and is thus usable independently of the height of snow and of other unfavorable ground conditions.

The above and other objects and advantages of the present invention will be better understood in the light of the following detailed description of a preferred embodiment thereof which is illustrated, by way of example, in the accompanying drawings, in which.

Figure 1:
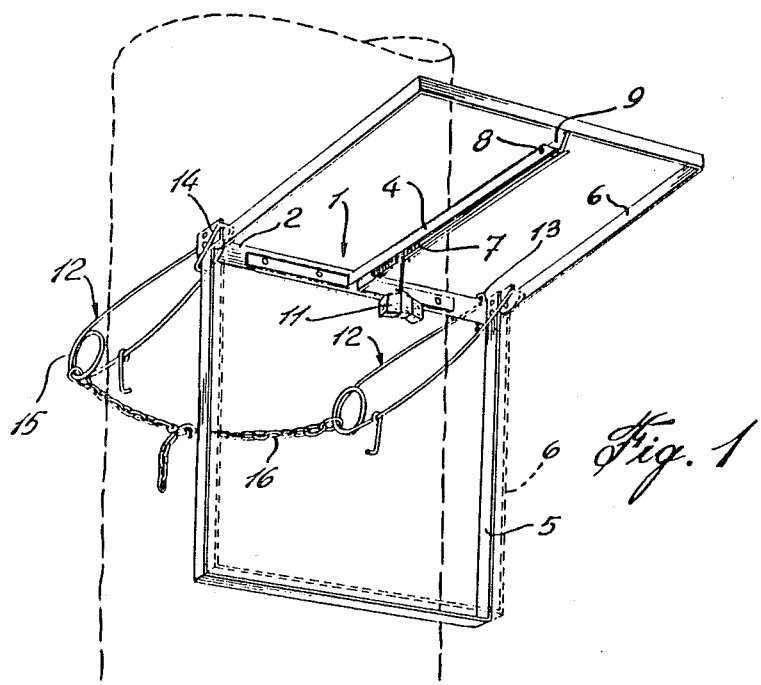
FIG. 1 is a perspective view of an animal trap shown in operative open position.

The illustrated animal trap comprises a mounting bracket 1 including a transverse bar 2 having opposite ends 3 bent at right angle and on the same side thereof. The mounting bracket also includes a pair of L-shape bracket members, each having an arm 4 projecting endwise from the transverse bar 3. The arms 4 are laterally spaced from each other in the transverse direction defined by the transverse bar 3.

A V-shaped jaw 5 has its opposite ends fixedly secured to the opposite ends 3 of the transverse bar 2 and depends therefrom in an operatively vertical plane. A movable U-shape jaw 6 has its opposite ends pivoted to the opposite ends 3 of the transverse bar 2 about a transverse axis for pivoting of the movable jaw 6 toward and away relative to the fixed jaw 5. As shown in the drawings, the movable jaw 6 is made such that its intermediate portion will project farther from the plane of the fixed jaw 5 than the free or outer end of the arms 4.

Figure 2:
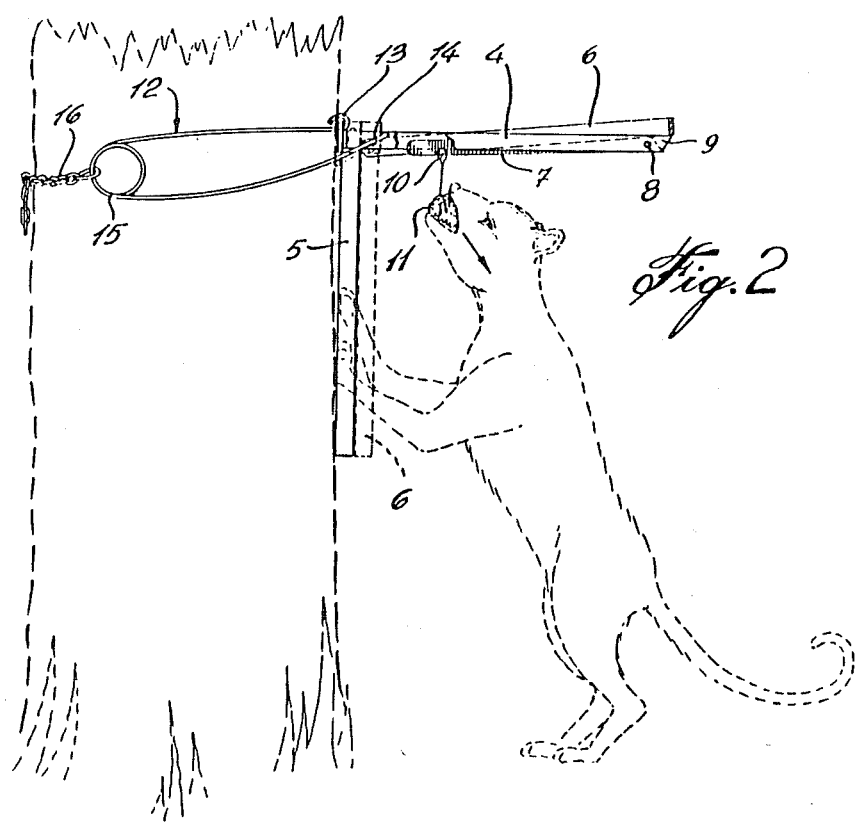
FIG. 2 is a lateral view of the same animal trap in operative position against a tree and showing an animal with the bait in its mouth.
Figure 5:
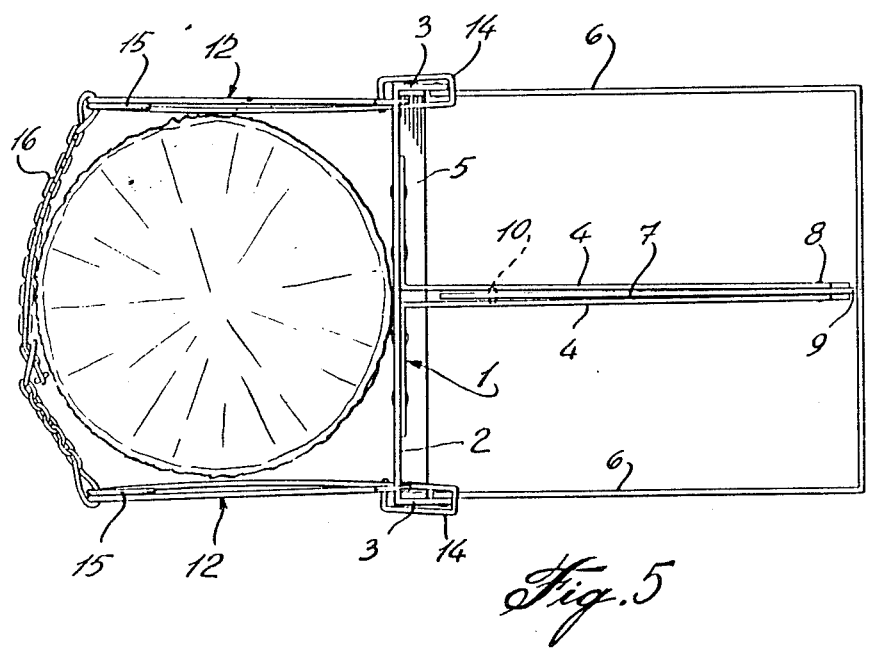
FIG. 5 is a top view of the same animal trap.
Figure 6:
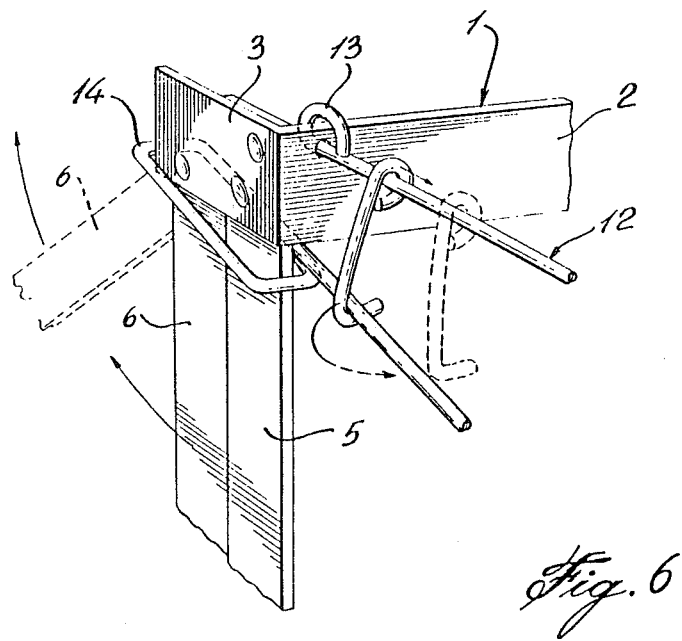
FIG. 6 is an enlarged perspective view of a detail of a spring connection in the same animal trap.

A detent lever 7 is pivoted between the arms 4 about a pivot axis at 8 that extends substantially parallel to the pivot axis of the movable jaw 6. The detent lever 7 has a shorter end portion 9 that forms a catch adapted to engage under the intermediate portion of the movable jaw 6 to hold the latter in readiness in elevated position. The detent lever 7 is provided with a transverse projection at 10 that forms a stopper portion resting against the lower edge of the arms 4 that thus form an abutment against clockwise pivoting of the detent lever when the movable jaw 6 rests on the catching portion 9 of the detent lever, as in FIGS. 1, 2, and 5. The transverse stopper portion at 10 also provides for attachment of a bait 11 to the inner end of the detent lever.

Figure 3:
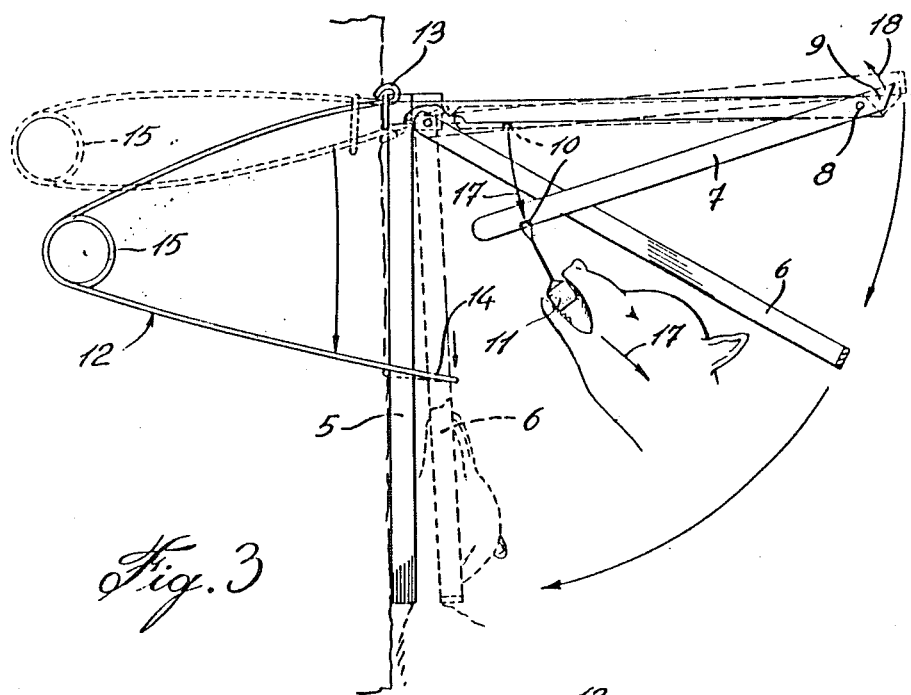
FIG. 3 is a side view of the same animal trap in the course of closing.
Figure 4:
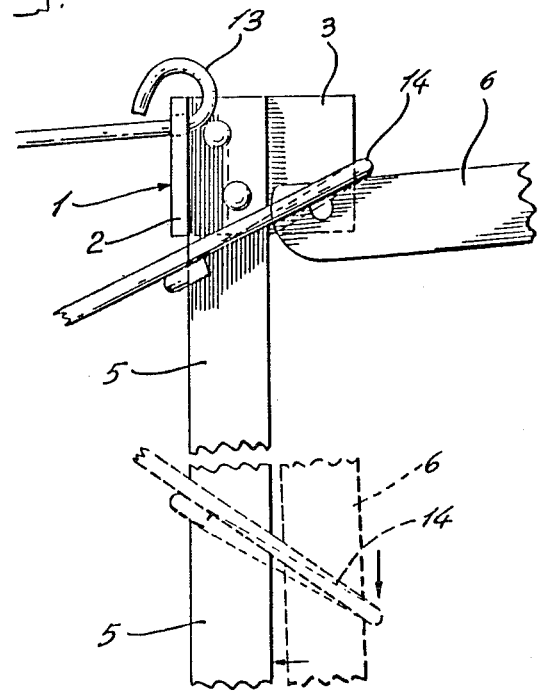
FIG. 4 is an enlarged scale side view of a portion of the animal trap showing the two extreme positions of a movable jaw and the associated spring.

The movable jaw 6 is biased for forcefulclosing toward the fixed jaw 5 by a pair of spring wires 12. Each spring wire 12 includes one end 13 fixedly hooked to the transverse bar 2 at its corresponding end. Each spring wire 12 has its other end 14 forming an elongated loop extending around the corresponding end of both jaws 5 and 6 and slidable along the same. Each spring wire 12 also includes an intermediate loop or coil portion 15 adapted to bias the end 14 away from the end 13, such that when the detent lever releases the movable jaw, the loop 14 of each spring will move down along the corresponding upright end of the fixed jaw, while simultaneously acting on the corresponding end of the movable jaw, as shown in FIGS. 3 and 4, to pivotally and forcefully pivot the movable jaw toward the fixed jaw.

A link, in the form of a chain 16, has its opposite ends connected to the intermediate loop of the spring wires 12. Thus, the afore-described animal trap may be operatively attached or secured to a tree, post, or the like support. This is done by resting the mounting bracket 1 and the fixed jaw 5 upright against the tree with the springs 12 straddling the tree and by then attaching the chain 16 on the opposite side of the tree relative to the fixed jaw. The trap is then prepared for operation by upwardly pivoting the movable jaw 6 and the detent lever 7 and resting the movable jaw on the end of the catching portion 9. The transverse portion 10 then stops the detent lever by upward engagement against the abutment defined by the inner end of the parallel arms 4.

When an animal even only slightly touches the bait 11 to pull it in the direction of the arrows 17, the tip of the catching portion 9 upwardly pivots and frees the movable jaw 6, as shown by the arrow 18. The springs 12, as aforedescribed, then pivotally closes the movable jaw against the neck of the trapped animal.

What I claim is:

1. An animal trap comprising a fixed jaw, a movable jaw pivotable toward and away relative to the fixed jaw, spring means connected to the movable jaw and operatively biasing the latter pivotally toward the fixed jaw, a detent lever pivotaly secured relative to the fixed jaw, an abutment device fixedly secured relative to the fixed jaw constructed and arranged to intercept the detent lever in one angular direction around the pivotal axis thereof, and the detent lever including a catching portion operatively intercepting the movable jaw against the spring bias acting in opposite angular direction thereon relative to said one angular direction and relative to the pulling action by an animal on a bait attached to the detent lever, said spring means including two spring wires each having a pair of opposite ends fixedly secured to the fixed jaw and in biasing engagement with the movable jaw respectively, and an intermediate loop portion projecting from the fixed jaw on the opposite side thereof relative to the movable jaw in laterally spaced-apart relationship arranged for straddling of a support, and further including a link which has opposite ends attached to the intermediate loop portions of the two wires and which operatively extends around said support on the opposite side thereof relative to the fixed jaw to hold the fixed jaw vertically against said support.

2. An animal trap comprising a fixed jaw, a mounting bracket to which said fixed jaw is secured, said mounting bracket extending in the plane of said fixed jaw and including a projection extending away from said plane, a movable jaw and a detent lever pivotally connected to the mounting bracket and to the projection thereof, about laterally-spaced axes respectively, spring means connected to said movable jaw and operatively biasing the latter pivotally toward the fixed jaw from an open position angularly away from said fixed jaw, said movable jaw in said open position extending away from said fixed jaw farther then said projection, said detent lever including a catching portion which projects on the opposite side of the pivot axis of the detent lever relative to the fixed jaw and away from said projection a predetermined distance to intercept the movable jaw and operatively hold the latter in said open position, pulling action exerted by an animal on a bait attached to the detent lever, causing the latter to pivot in a releasing direction, so that said catching portion releases said movable jaw, and further including an abutment device secured to said projection in a position intermediate said fixed jaw and the pivot axis of the detent lever to intercept the detent lever and prevent its pivotal movement in a direction opposite to said releasing direction.

3. An animal trap as defined in claim 2, wherein said bracket includes a pair of laterally spaced-apart arms projecting endwise away from the predetermined plane of the fixed jaw and defining said projection, the detent lever is pivotally mounted in the space defined between the laterally spaced-apart arms, extends longitudinally of the latter, and includes a transverse stopper portion, and the laterally spaced-apart arms define an abutment portion operatively registering with the transverse stopper portion of the detent lever and constituting said abutment device pivotally intercepting the detent lever.

4. An animal trap as defined in claim 3, wherein said spring means comprises a pair of spring wires, each including a pair of opposite ends fixedly secured to the fixed jaw and in biasing engagement with the movable jaw, respectively, and an intermediate loop portion projecting from the fixed jaw on the opposite side thereof relative to the movable jaw, and a chain having opposite ends attached to the intermediate loop poritons defined by the spring means and adapted to operatively extend around a support on the opposite side thereof relative to the fixed jaw to hold the fixed jaw vertically against said support.

* * * * *